United States Patent [19]

Shotwell

[11] 4,350,122

[45] Sep. 21, 1982

[54] INSECT TRAPPING COLLAR

[75] Inventor: Thomas K. Shotwell, Dallas, Tex.

[73] Assignee: Farnam Companies, Inc., Phoenix, Ariz.

[21] Appl. No.: 252,378

[22] Filed: Apr. 9, 1981

[51] Int. Cl.³ .............................................. A01K 27/00
[52] U.S. Cl. .................................. 119/106; 119/156
[58] Field of Search .................. 119/106, 156; 43/107, 43/114, 115, 121

[56] References Cited

U.S. PATENT DOCUMENTS

| 2,315,772 | 4/1943 | Closs | 43/121 X |
| 3,755,958 | 9/1973 | Bradshaw | 43/114 |
| 3,814,061 | 6/1974 | Aries et al. | 119/106 |
| 3,816,956 | 6/1974 | Sekula | 43/114 |
| 4,068,624 | 1/1978 | Ramney | 119/106 |

Primary Examiner—Paul J. Hirsch
Assistant Examiner—Robert P. Swiatek
Attorney, Agent, or Firm—LaValle D. Ptak

[57] ABSTRACT

A non-poisonous flea trapping collar for dogs and cats is in the form of a collar or collar attachment member having dark recesses in it. The recesses are coated with or contain a sticky substance which traps and holds any fleas entering them. Fleas are thereby trapped and killed without endangering the pets on which the collar is used, and without subjecting persons coming in contact with the pet to harmful poisons.

5 Claims, 12 Drawing Figures

INSECT TRAPPING COLLAR

BACKGROUND OF THE INVENTION

Control of insects on both large and small animals long has been a problem. Many insects cause discomfort to the animals and carry diseases or otherwise impair the health of the animals attacked or molested by such insects. Typical problems exist with flies which impair the health of horses and cattle and with fleas and ticks which irritate and impair the health of dogs and cats. The most common solution, both for large and small animals, generally is to apply some type of insecticide to the animal either by spraying, dipping, bathing, or the like, in an effort to kill or repel the troublesome insects. At best, this procedure is only a temporary solution. The particular insects which are on the animal or come into contact with it shortly after the insecticide spraying or dipping operation takes place are killed. The insecticide, however, soon wears off or its effectiveness diminishes; and within a relatively short time, additional infestation and molestation of the animal by new insects takes place.

For cattle, a more or less continuous insect control has been attempted in the form of "rubbing" stanchions. These disperse measured amounts of insecticides onto the coat of the animal whenever it rubs up against the stanchion or passes underneath a frame, or the like, typically located near a place where the animal regularly feeds or drinks so to cause periodic contact of the animal with the insecticide dispensing apparatus. While this approach is somewhat effective for large animals, particularly cattle, it is an approach which has not been used for house pets.

A disadvantage to insecticide dispensing stations, for large animals, is that they are fixed in location and if the animal wanders away from such stations, the control which is obtained at the station no longer is obtained. In an effort to control the infestation of horses and cattle from flies, it has been proposed in the past to attach a sheet of sticky fly paper to the back of a horse or cow. Such an approach dates back many years and is disclosed in the U.S. Pat. Nos. to Farnam, 532,454, issued Jan. 15, 1895, and 544,295, issued Aug. 13, 1895. Similar approaches also have been taken in the devices disclosed in the U.S. Pat. Nos. to Foley, 1,560,683, issued Nov. 10, 1925, and Drummond, 1,972,762, issued Sept. 4, 1934.

In place of attaching a sheet of sticky fly paper to the back or a horse or cow, the McConnell U.S. Pat. No. 790,651, issued May 23, 1905, discloses a sticky paper fly trap device which is hung on the trace of the harness of a horse.

A more ambitious attempt to control flies on cattle is disclosed in the patent to Pierce, U.S. Pat. No. 2,688,311, issued Sept. 7, 1954. This patent discloses a relatively large blanket which is glued to the hairs on the back of a cow to (1) prevent flies from attaching themselves to the animal's back and (2) for trapping grubs after they emerge from the skin to prevent the fall of the grubs to the ground for hibernation.

The foregoing attempts at controlling flies on large animals are wholely unacceptable for small animals such as dogs or cats. The sticky fly paper of most of these patents is exposed and since small animals often are in close contact with humans and household environments, the rubbing of the animal against furniture or persons naturally would result in the transfer of the sticky fly paper glue to whatever objects or persons were being touched by the animal. Consequently, approaches of the types described in the above patents are not feasible for small animals. In addition, the insect control problem for small animals is not primarily a problem with flies, but instead is a problem with infestation of fleas and ticks. The nature of fleas and ticks is quite different from flies and they travel about on the animal's skin through, over, and underneath the hair; so that they are both difficult to locate and control.

A relatively popular approach to controlling fleas on dogs and cats more recently has been in the form of chemical poison "flea collars" which continuously dispense a minute amount of flea killing poison powder or vapor from the collar while the dog or cat is wearing it. Three patents directed to this type of solution for controlling fleas are the U.S. Pat. Nos. to McAndless, 4,047,505, issued Sept. 13, 1977, Colliard, 4,091,766, issued May 30, 1978; and Buzzell, et al, 4,184,452, issued Jan. 22, 1980. Such "flea" collars for dogs and cats generally contain organophosphate insecticides.

Two major problems exist in conjunction with insecticide dispensing collars for flea control. First, the insecticide in the flea collar has been found to depress the cholinesterase enzyme in the nervous systems of dogs and cats. Secondly, whenever persons come in contact with a dog or the cat wearing such a collar, they also come in contact with the poison dispensed from the collar. This is particularly a problem with respect to children who often put their hands in their mouths or rub their eyes after touching a pet. With an increasing awareness of the dangers of various types of chemical poisons, many people are reluctant to use such a poison collar control device to eliminate fleas from their pets.

It is desirable to provide a simple, non-poisonous approach to the control of fleas on dogs and cats which is not subject to any of the foregoing disadvantages present in the various prior art patents and devices mentioned above. It is particularly desirable to provide a system for the diagnosis of the presence of fleas or ticks and for the elimination or control of such insect pests without using poisons and without attaching unsightly paraphernalia to the dog or cat on which the device is used.

SUMMARY OF THE INVENTION

Accordingly, it is an object of this invention to provide an improved insect control device for animals.

It is another object of this invention to provide an improved insect control device for small animals, such as dogs and cats.

It is an additional object of this invention to provide an improved non-poisonous, non-toxic insect control device for small animals.

It is yet another object of this invention to provide an improved collar for small animals which traps small crawling pests, such as fleas, ticks, lice and mites therein.

In accordance with a preferred embodiment of this invention, an insect trapping collar comprises a base collar member which is to be placed about the neck of an animal for controlling insects on that animal. The base collar member includes additional means on it for entrapping the insects, and this additional means is located so that the trapped insects are not exposed to view when the base collar member is in place on the animal. In a more specific embodiment of the invention, the base collar member comprises a collar portion which has recesses in it. The recesses in turn are coated with a tacky substance which traps and holds insects, such as fleas, coming into contact with the substance.

DETAILED DESCRIPTION

Figure 1:
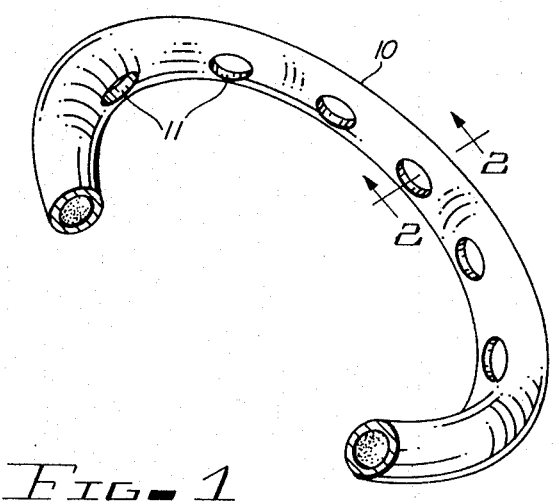
FIG. 1 is a partially cut-away perspective view of a preferred embodiment of the invention.

Reference now should be made to the drawing in which the same reference numbers are used throughout the several figures to designate the same or similar components. Various embodiments are shown in the different figures, but all of these embodiments comprise collars or collar attachments to be worn by dogs and cats for the primary purpose of controlling and eliminating fleas from the animal wearing the collar or collar attachment.

Figure 10:
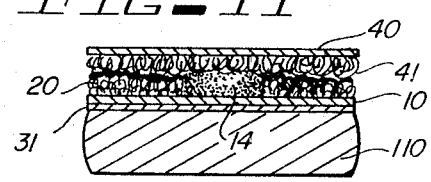
FIG. 10 is a partially cut-away perspective view of another embodiment of the invention.

FIG. 1 illustrates one form which such a collar might take. In the embodiment illustrated in FIG. 1, the collar is in the form of a hollow flexible tube 10, made of plastic or other suitable material. The respective ends of the collar having the buckle or clasp on them are not shown, and instead the collar has been illustrated as partially cut-away; so that the details of the collar construction may be seen more readily. Various types of fasteners may be used on the opposite ends of the collar 10 to hold it in place on the neck of the dog or cat on which the collar is worn. Similarly, various different types of material may be used for the main body portion 10 of the collar, so long as the material is capable of maintaining its hollow tubular configuration, as illustrated in FIG. 10, when it is being worn.

The portion of the collar member 10 which faces the skin or fur of the animal has a number of spaced holes 11 cut or otherwise formed in it; so that when the collar 10 is being worn by the animal, the holes 11 are not visible. These holes 11, however, permit access to the interior of the collar by fleas or immature stages of ticks, and the like, when these pests traverse the neck of the animal.

As is well known, fleas are very mobile and continuously move about over the body of an animal infested with them. This movement is believed to be generally random, but fleas move through the neck area of the animal frequently as they move from the head to the shoulders to the flanks and back to the head. As fleas approach the collar, they are enticed into its dark interior through the holes 11 and enter the inside of the tubular collar member 10. The inside of the collar member 10 is coated with a non-drying, tacky or sticky layer of glue 14, which has a sufficiently high viscosity to hold a flea entrapped in it once the flea steps onto the glue 14. Various types of suitable materials for use in the tacky glue layer 14 are presently commercially available, and the preferred materials have a polyisobutylene or polybutene base as the active ingredient. The particular ingredients of the glue or tacky layer 14, however, are not important so long as it retains the characteristics of not repelling the pests and of not drying out or becoming hard over a relatively long period of time.

The darkness within the interior of the tubular collar member 10 in and of itself is sufficient to attract a large number of the migrating fleas passing beneath the collar area. If desired, however, a suitable insect attractant also may be added to the glue substance 14 to further increase the chances of any given flea entering one of the openings 11 as it passes the collar in its migration through the neck area of the animal on which the collar is worn.

Figure 2:
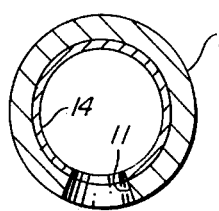
FIG. 2 is a cross-sectional view taken along the line 2—2 of the embodiment shown in FIG. 1.
Figure 4:
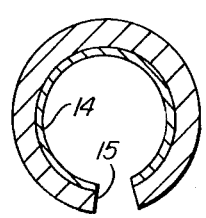
FIG. 4 is a cross-sectional view taken along the line 4—4 of FIG. 3.
Figure 3:
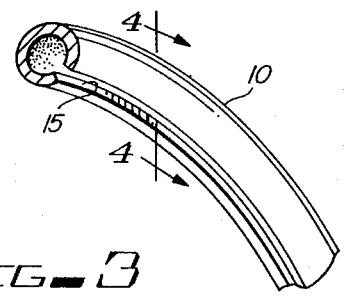
FIG. 3 is a partially cut-away perspective view of another embodiment of the invention.

FIGS. 3 and 4 show another variation of the collar of FIG. 1. The collar shown in FIG. 3 is constructed in essentially the same manner as the one in FIG. 1 except that the tubular collar member 10 has a slit 15 formed in it on the surface which faces the neck of the dog or cat in place of the holes 11 shown in the version of FIGS. 1 and 2. The slit 15 serves the same purpose as the holes 11 and acts as an entry door or opening to the darkened interior of the collar. Thus, fleas pass through the opening 15 to become entrapped on the tacky glue layer 14, which coats the interior of the tubular collar member 10. The details of this construction are shown most clearly in the cross-sectional view of FIG. 4.

Figure 5:
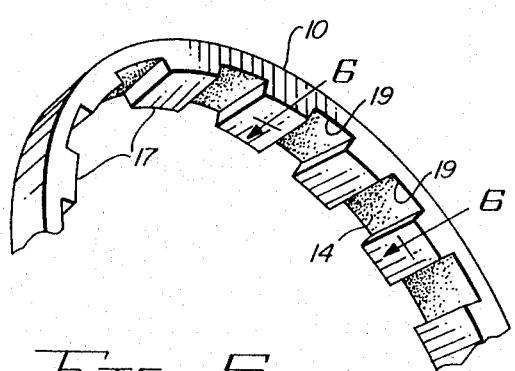
FIG. 5 is a partially cut-away perspective view of another embodiment of the invention.
Figure 6:
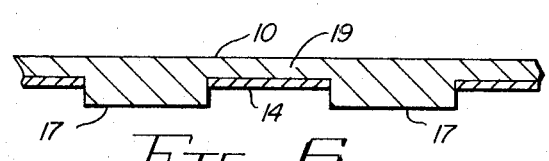
FIGS. 6 and 7 are cross-sectional views taken along the line 6—6 of FIG. 5 showing additional details of the embodiment of FIG. 5.
Figure 7:
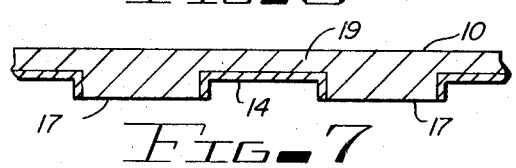

Another variation which may be used for the collar 10 is shown in FIGS. 5, 6 and 7. In place of a hollow tubular member, the collar shown in FIG. 5 is made of a relatively flat strip of flexible material. The outer surface of the collar member 10 shown in FIG. 5 is smooth and has the general appearance of the collars commonly worn by dogs and cats. This material may be finished in a variety of colors which may be either coated on or molded into the collar depending upon the manner of its manufacture. The inner surface or the collar shown in FIGS. 5, 6 and 7, however, is not smooth. Instead, the inner surface is in the form of a undulating pattern or a series of raised flat-topped teeth 17 separated by recesses or valleys 19. The overall pattern is shown most clearly in FIG. 5. FIGS. 6 and 7 are cross-sectional views of a portion of the collar member 10 shown in FIG. 5 to illustrate the manner in which the tacky glue layer 14 is placed in each of the recesses 19. As shown in FIG. 6, the tacky glue layer 14 may coat only the bottom of the recesses 19 in the area which faces the neck of the dog or cat on which the collar is worn. In the alternative, the tacky glue layer 14 may cover both the bottoms and sides of the recesses 19, as illustrated in FIG. 7.

The overall effect of the use of the collar shown in FIGS. 5, 6 and 7 is the same as in the versions shown in FIGS. 1 through 4. When the recesses 19 face the neck of the animal, they form relatively dark hiding places for the fleas, which crawl into the recesses 19 and become stuck in the tacky substance 14 thereby entrapping and killing them.

Figure 8:
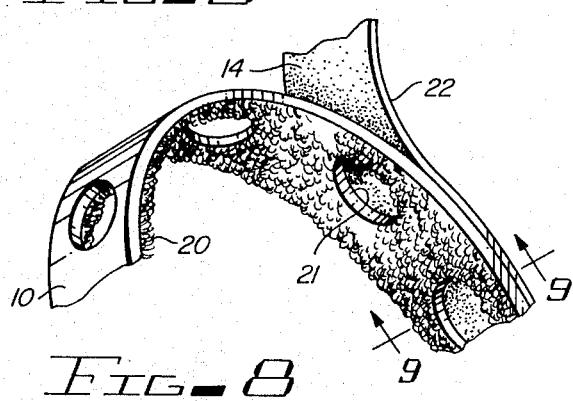
FIG. 8 is a partially cut-away perspective view of another embodiment of the invention.
Figure 9:
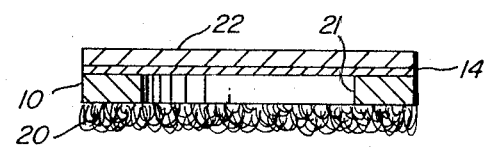
FIG. 9 is a cross-sectional view taken along the line 9—9 of FIG. 8.

Another version of a flea trap collar which is somewhat similar in its construction and function to the collar shown in FIGS. 5, 6 and 7 is illustrated in FIGS. 8 and 9. In the collar shown in FIGS. 8 and 9, the main body portion of the collar is formed from strips of one-half of a common "hook-and-loop" fabric fastener, such as a Velcro fastener. Either the male or the female fastener material may be used, but the mating portion is not utilized in the embodiment shown in FIGS. 8 and 9. The strips of hooks or loops fabric 20 have a number of spaced holes 21 punched in them, much in the manner in the holes 11 punched through the collar member 10 shown in FIG. 1. The outer surface of the collar member 10 shown in FIG. 8 then has a thin plastic strip 22 adhered to it by means of a coating of the tacky glue layer 14 applied to its inner surface. The tacky glue layer 14 bonds the plastic strip 22 to the outside of the collar 10 and is exposed through the holes 21; so that fleas entering the holes 21 become stuck in the glue layer 14 on the inner surface of the strip 22. The details of this construction are shown most clearly in FIG. 9.

Figure 11:
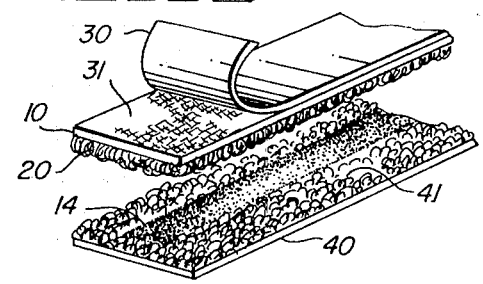
FIG. 11 is an exploded perspective view of a portion of the embodiment shown in FIG. 10.
Figure 12:
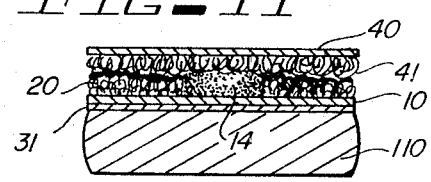
FIG. 12 is a cross-sectional view taken along the line 12—12 of FIG. 10.

Another variation of the collar construction is illustrated in FIGS. 10, 11 and 12. In the version shown in these Figures, the flea trap is in the form of strips of material which are attached to the existing collar of a dog or cat. As illustrated in FIGS. 10 and 12, the existing collar is identified by the reference number 110. This collar typically may be made of a variety of substances, such as leather, plastic, or the like. The particular configuration of the collar is not significant so long as it has a relatively flat surface to which an adhesive-backed base collar member 10 may be attached.

Typically, the structure shown in FIG. 10 is made in the form of relatively short strips of material on the order of three inches or so in length. The material employed is the well known "hook and loop" fabric fasteners, such as Velcro. In contrast to the embodiment shown in FIGS. 8 and 9, however, both the male and female layers are employed in the structure shown in FIGS. 10, 11 and 12. The base collar member 10 comprises, for example, the male layer and has on its inner surface a plurality of depending hooks 20, illustrated most clearly in FIGS. 11 and 12. The facing female layer 40 has attached to its inner surface the mating female loops 41, which are engaged by the hooks 20 in a well known manner to attach together the two layers 10 and 40. Before these layers are attached together, however, a strip of tacky glue 14 of the type used in the various other embodiments described above is applied to one or the other of the mating surfaces of the material strips 10 or 40. As illustrated in FIG. 11, this glue strip is applied to the loop surface 41 of the strip 40. The strips 10 and 40 then are pressed together to engage one another to form the sandwich illustrated in FIG. 12. This sandwich has the tacky glue strip 14 running throughout its length near the middle.

To facilitate packaging and handling, an adhesive layer 31 is applied to the outside of the strip 10 and then is covered with a peel-off backing 30. Thus, when the sandwich of the material strips 10 and 40 are sold, the backing 30 is in place over the adhesive 31. When a pet owner desires to attach one or more of the strip segments 10/40 to the collar of his dog or cat, the peel-off backing layer 30 is removed and discarded. The adhesive layer 31 then is pressed against the outer surface of the collar 110 of the pet to secure it to the collar. When this is done, the effective collar construction is in the configuration shown in FIG. 12. The hook and loop members 20 and 41, respectively, come together with a considerable amount of space between them. the fleas enter into this space which forms a dark haven in which they go to hide or randomly enter, and as they make their way through the sandwich area formed by the interengaged male and female portions 20 and 21, they come into contact with the tacky substance 14. When this occurs, the fleas become immobilized and trapped in the area between the strips 10 and 40.

From the foregoing, it is apparent that the invention may be carried out in a number of different forms. The collar constructions and collar attaching segments which have been described in conjunction with the drawings are to be considered illustrative of the concepts of the invention and not as limiting. Various other configurations and forms of the collar constructions or collar attachments will occur to those skilled in the art without departing from the true scope of the invention.

I claim:

1. An insect trapping collar including in combination:
   a base collar member in the form of a hollow tube having holes formed through the inner side thereof for placement about the neck of an animal, the holes in said collar member facing the neck of an animal when said collar member is in place; and
   a tacky substance coated on at least a portion of the hollow interior of said base collar member for entrapping insects inside said collar member so that trapped insects are not exposed to view when said base collar member is in place on an animal.

2. An insect trapping collar including in combination:
   a base collar member in the form of a generally flat, elongated strip having a smooth outer surface and having an undulating inner surface for facing the neck of an animal about which said base collar member is placed; and
   a tacky substance on the recesses formed on said undulating surface of said base collar member for entrapping insects so that trapped insects are not exposed to view when said base collar member is in place on an animal.

3. A base collar member in the form of first and second strips of matingly engaged hook and loop fastener material, one of said strips comprising hook members and the other of said strips comprising loop members; and
   a tacky substance sandwiched between said strips when said strips are in facing engagement with one another for entrapping insects between said first and second strips so that trapped insects are not exposed to view when said base collar member is in place on an animal, the dimensions of said hook members and loop members of said strips being such that the interstices formed when said members are in engagement with one another are sufficient to permit insects to move therebetween for engagement with said tacky substance.

4. The combination according to claim 3 wherein the outer surface of one or the other of said first and second strips is coated with an adhesive for attachment to a conventional animal collar.

5. The combination according to claim 4 wherein said tacky material comprises a non-drying, tacky glue having polyisobutylene as a primary active ingredient.

* * * * *